UNITED STATES PATENT OFFICE.

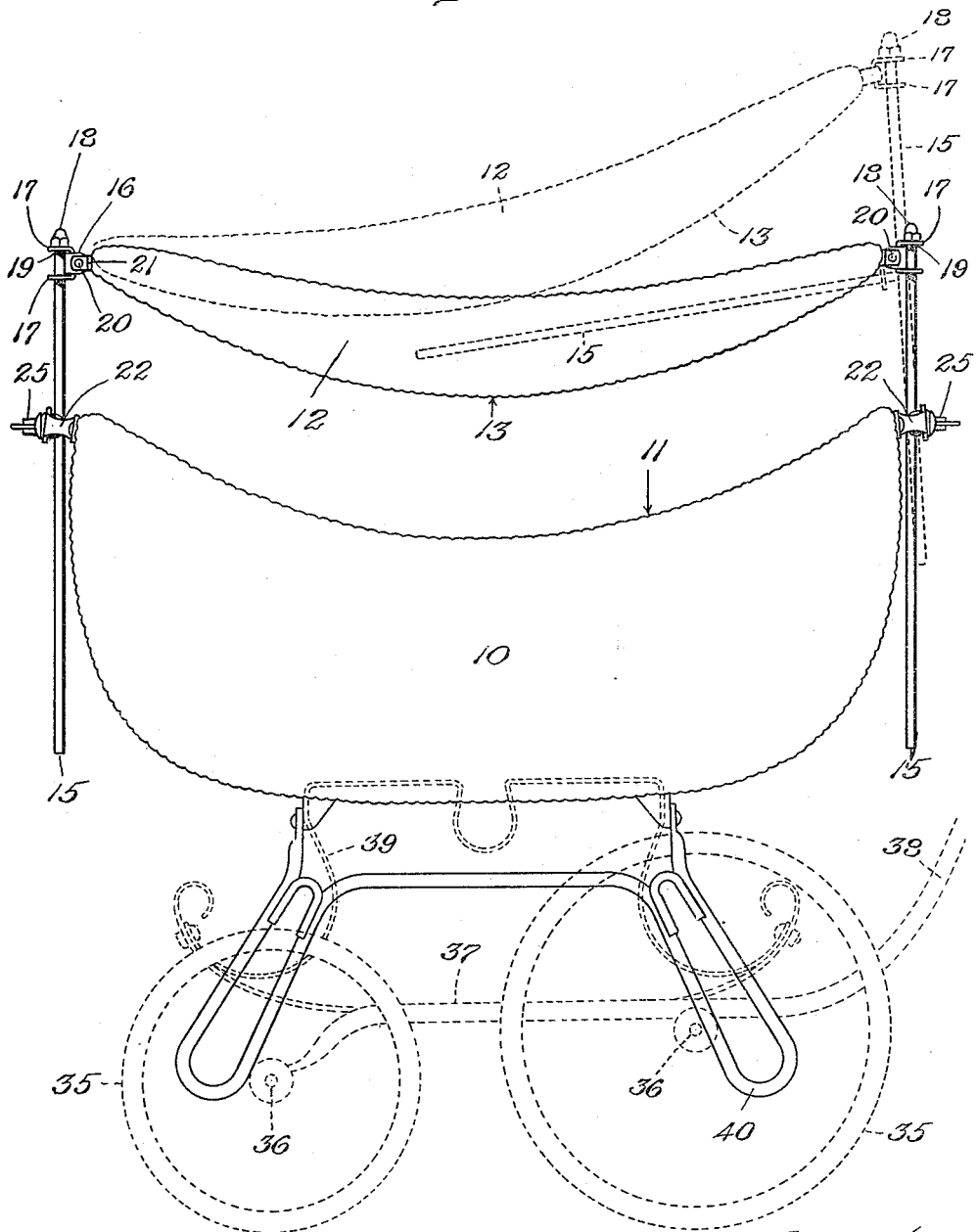

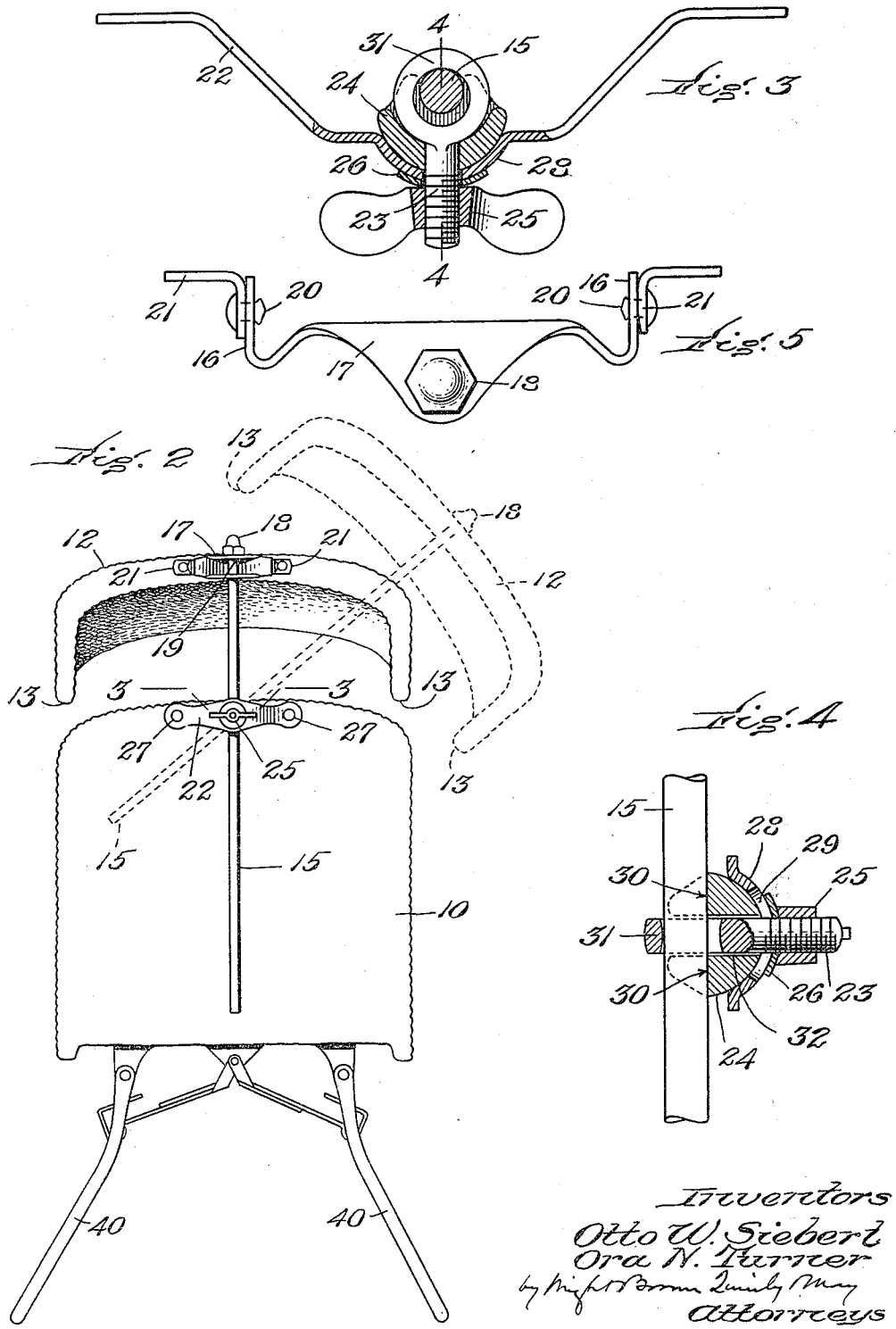

OTTO W. SIEBERT AND ORA N. TURNER, OF TEMPLETON, MASSACHUSETTS; SAID TURNER ASSIGNOR TO BAY STATE METAL WHEEL COMPANY, OF TEMPLETON, MASSACHUSETTS, A CORPORATION OF MAINE.

CHILD'S BASSINET AND CANOPY THEREFOR.

1,193,722.                  Specification of Letters Patent.      Patented Aug. 8, 1916.

Application filed June 16, 1915. Serial No. 34,372.

*To all whom it may concern:*

Be it known that we, OTTO W. SIEBERT and ORA N. TURNER, citizens of the United States, and residents of Templeton, in the county of Worcester and State of Massachusetts, have invented certain new and useful Improvements in Children's Bassinets and Canopies Therefor, of which the following is a specification.

The object of the present invention is to provide a child's bassinet, and a canopy therefor of a shape and size corresponding to the rim of the bassinet, together with improved means for attaching the canopy to the bassinet so that the canopy may be adjusted to various "open" positions relatively to the bassinet or to a "closed" position wherein the canopy may lie in contact with the rim of the bassinet.

The term "bassinet" is used in its comprehensive sense for the purpose of the present invention, as contemplating a body mounted upon a running frame to provide a baby carriage, as well as a bassinet in the restricted sense.

Of the accompanying drawings: Figure 1 represents a side elevation of a bassinet, a canopy, and canopy-supporting means, embodying the present invention, a running frame being represented by dotted lines to indicate how the bassinet might be mounted thereon to serve in the capacity of a baby carriage. Fig. 2 represents an end elevation of the bassinet as shown in Fig. 1. Fig. 3 represents a horizontal section through the structure intersected by line 3—3 of Fig. 2. Fig. 4 represents a section through the structure intersected by line 4—4 of Fig. 3. Fig. 5 represents a top plan view of one of the hinges which are fastened to the ends of the canopy.

The same reference characters indicate the same parts wherever they occur.

The bassinet, indicated at 10, may be of any suitable shape and construction, although for one purpose of the present invention it is preferably symmetrical and preferably scow shaped. By "symmetrical" we mean the same shape and size at both ends. The rim 11 of the bassinet, as shown, is lower in the middle than at the ends, this shape being preferred for artistic and other reasons, although rims of other shapes would be within the scope of the present invention.

The canopy, indicated at 12, is of substantially the same length and width as the bassinet and is also of substantially the same outline when viewed from above. Furthermore, the rim 13 of the canopy is shaped to conform to the rim 11 of the bassinet notwithstanding any substantial irregularities which may exist in the latter. In cross section the canopy is preferably crowned, as shown by Fig. 2. In consequence of shaping the rims 11 and 13 to conform to each other, the canopy may be adjusted to lie as close to the bassinet as may be desired, and it may lie in contact with the bassinet, in which case the rims 11 and 13 would effectively close the compartment in which the child might be lying. The bassinet and canopy would preferably be made of wickerwork, which would afford sufficient freedom of circulation for air so that the child's breathing would not be affected by completely closing the canopy, but would nevertheless exclude small animals, insects, and excessive wind and light.

The bassinet and canopy are provided with improved means capable of being adjusted to support the canopy in a variety of "open" positions, a few of which are indicated on the drawings. For this purpose two supporting rods 15, 15 are attached to the ends of the canopy by suitable hinges (Fig. 5), and suitable clamping devices (Figs. 3 and 4) are fastened to the ends of the bassinet to coact with said rods. Each hinge, as shown, comprises a sheet-metal member having hinge-ears 16 and rod-engaging ears 17. The rod extends through both said ears, and its upper end is screw-threaded to receive a capbolt 18. The rod has a shoulder at 19 on which the upper ear 17 is seated. The ears 16 are connected by pivot members 20 to angle-members 21, the latter being fastened to the rim of the canopy at the ends of the latter.

The clamping devices which support the rod 15 embody well known construction which enables the rods to be moved endwise and to assume various angular positions. Each clamping device comprises a sheet-metal bracket 22, an eyebolt 23, a saddle 24, a wingnut 25, and a washer 26. The two brackets 22 are fastened to the ends of the bassinet by suitable means such as screws 27. Each bracket has a cup-shaped portion 28 in which the saddle 24 is seated, the saddle and the portion 28 embodying a form of ball-and-socket clamp. The eyebolt 23 extends through the saddle and through an elongated hole 29 in the cup-shaped portion 28, said hole being elongated vertically but not otherwise. When the wingnut is tightened, the rod 15 is clamped against the portions 30, 30, (Fig. 4) of the saddle by the eye portion 31, such action at the same time causing the saddle to bind against the concave surface of the cup-shaped portion 28, thus holding the saddle frictionally against rotative movement. The saddle is formed with a recess 32 which conforms to the eye portion of the eyebolt and which prevents relative turning of the saddle and eyebolt. When the wingnut is loosened, the eyebolt, saddle, and the rod 15, are capable of turning about the axis of the shank of the eyebolt to enable the canopy to tilt from side to side, as indicated by dotted lines in Fig. 2. The rod is also capable of moving endwise with relation to the saddle and eyebolt to enable the canopy to be raised and lowered; and the eyebolt, saddle and rod are capable of turning about an axis at right angles to that of the shank of the eyebolt to enable the canopy to be inclined as indicated by dotted lines in Fig. 1. It is an inclined position such as the latter which requires the hinge connection between the rods and the canopy. When the wingnut is tightened, all the parts are clamped so that none of them are free to move. The devices by which the supporting rods are connected to the bassinet and canopy enable the rim of the latter to be brought into contiguous relation to the rim of the bassinet. When the canopy is detached from the bassinet the rods 15 may fold or swing against the under side of the canopy as indicated by dotted lines in Fig. 1, to facilitate packing, transportation, and handling.

We have shown the bassinet as being mounted upon a running frame comprising wheels 35, axles 36, reaches 37, push-bars 38, and a spring superstructure 39. For the purposes of the present invention it will not be necessary to show or describe any means for attaching the bassinet to the superstructure 39. It may be assumed, however, that if the bassinet is going to be used as the body of a baby carriage it will be provided with some suitable means for the purpose mentioned. It will be apparent, therefore, that the bassinet may rest upon a suitable stand such as the structure 39, whether such structure be mounted upon wheels or whether it be a stationary stand of well known construction.

The bassinet as shown is provided with legs 40 which are pivotally mounted so as to be capable of folding upwardly under the bassinet to enable the latter to be mounted upon a running frame, as shown by Fig. 1. When the legs are unfolded as shown, they constitute a sufficient stand.

We claim:

1. In combination, a bassinet and canopy therefor, a pair of rod-supporting devices fastened to the ends, respectively, of said bassinet, a pair of canopy-supporting rods engaging said devices respectively, and hinges connecting said rods respectively with the ends of said canopy, the axes of said hinges extending transversely of the canopy, each of said rod-supporting devices comprising a fixture, and swiveled clamping means arranged to clamp such fixture and rod conjointly, said rods being adjustable endwise with relation to said clamping means, and the latter being adjustable to enable said rods to tilt forward and back, and from side to side, relatively to said bassinet.

2. In combination, a bassinet and canopy having conforming rims, a pair of rod-supporting devices fastened to the ends, respectively, of said bassinet, a pair of canopy-supporting rods engaging said devices respectively, and hinges connecting said rods respectively with the ends of said canopy, the axis of said hinges extending transversely of the canopy, each of said rod-supporting devices comprising a fixture, and swiveled clamping means arranged to clamp said fixture and rod conjointly, said rods being adjustable endwise with relation to said clamping means to enable the rim of said canopy to lie in substantially contiguous relation to the rim of said bassinet, and to enable said canopy to be raised, each said clamping means being adjustable relatively to its said fixture to enable said rods to tilt forward and back, and from side to side, relatively to said bassinet.

In testimony whereof we have affixed our signatures.

OTTO W. SIEBERT.
ORA N. TURNER.

Copies of this patent may be obtained for five cents each, by addressing the "Commissioner of Patents, Washington, D. C."